(12) United States Patent
Aupperle et al.

(10) Patent No.: US 10,370,593 B2
(45) Date of Patent: *Aug. 6, 2019

(54) CONTROLLED KILN AND MANUFACTURING SYSTEM FOR BIOCHAR PRODUCTION

(71) Applicant: BIOCHAR NOW, LLC, Loveland, CO (US)

(72) Inventors: Donald P. Aupperle, Seattle, WA (US); Mikel S. Olander, Johnstown, CO (US); Benjamin M. Beierwaltes, Longmont, CO (US); William T. Beierwaltes, Loveland, CO (US); James G. Gaspard, II, Loveland, CO (US)

(73) Assignee: Biochar Now, LLC, Loveland, CO (US)

( * ) Notice: Subject to any disclaimer, the term of this patent is extended or adjusted under 35 U.S.C. 154(b) by 466 days.

This patent is subject to a terminal disclaimer.

(21) Appl. No.: 14/378,357

(22) PCT Filed: Feb. 13, 2013

(86) PCT No.: PCT/US2013/025999
§ 371 (c)(1),
(2) Date: Aug. 13, 2014

(87) PCT Pub. No.: WO2013/123096
PCT Pub. Date: Aug. 22, 2013

(65) Prior Publication Data
US 2015/0136581 A1 May 21, 2015

Related U.S. Application Data

(60) Provisional application No. 61/604,469, filed on Feb. 28, 2012, provisional application No. 61/599,910, (Continued)

(51) Int. Cl.
*C10B 1/00* (2006.01)
*C10B 1/04* (2006.01)
(Continued)

(52) U.S. Cl.
CPC .............. *C10B 9/00* (2013.01); *B01D 53/885* (2013.01); *C10B 1/04* (2013.01); *C10B 25/20* (2013.01);
(Continued)

(58) Field of Classification Search
CPC ......... C10B 49/02; C10B 47/06; C10B 53/02; C10B 53/07; C10B 47/16; C10B 1/04;
(Continued)

(56) References Cited

U.S. PATENT DOCUMENTS 414,938 A * 11/1889 Burcey .................. C10B 47/06
202/105
2,847,369 A 8/1958 Hughes
(Continued)

FOREIGN PATENT DOCUMENTS

JP 4267968 B2 5/2009
KR 10-2002-0010902 A 2/2002
(Continued)

OTHER PUBLICATIONS

"Autoclaves", Paterson Industries, Jan. 23, 2007 (date obtained using Google search tools), avialble online at: http://www.pattersonindustries.com/autoclaves _pics.html See in Particular: http://www.pattersonindustries.com/images/hors%20014-a.jpg.*
(Continued)

*Primary Examiner* — Jonathan Miller
*Assistant Examiner* — Jonathan Luke Pilcher
(74) *Attorney, Agent, or Firm* — Trenner Law Firm, LLC; Mark D. Trenner

(57) ABSTRACT

A controlled kiln and manufacturing system for biochar production, including control systems and subsystems. An
(Continued)

example controlled kiln (100) includes a drum (200), a lid (120) and a floor (250) together forming a combustion chamber configured to contain feedstock for conversion into biochar. A catalytic converter (700) may be operatively coupled with an outlet of the kiln (100). A conversion process completion detection subsystem may be operative to issue notifications. An example biochar manufacturing system includes at least one of the controlled kilns (100), a feedstock filling station (1010, 1020, 1030) for providing feedstock to kiln 100, a firing line (1040) for receiving the kiln containing feedstock, a tipping station (1050) for receiving biochar from the kiln, a biochar sizing station, and an automated handler (800) configured to move the kiln between the feedstock filling station (1010, 1020, 1030), the firing line (1040) and the tipping station (1050).

10 Claims, 15 Drawing Sheets

Related U.S. Application Data filed on Feb. 16, 2012, provisional application No. 61/599,906, filed on Feb. 16, 2012.

(51) Int. Cl.

| | | |
|---|---|---|
| C10B 49/02 | (2006.01) | |
| C10B 53/02 | (2006.01) | |
| C10L 5/44 | (2006.01) | |
| C10B 9/00 | (2006.01) | |
| B01D 53/88 | (2006.01) | |
| F23G 7/07 | (2006.01) | |
| C10B 25/20 | (2006.01) | |
| C10B 41/04 | (2006.01) | |

(52) U.S. Cl.
CPC .............. *C10B 41/04* (2013.01); *C10B 49/02* (2013.01); *C10B 53/02* (2013.01); *C10L 5/442* (2013.01); *F23G 7/07* (2013.01); *B01D 2257/502* (2013.01); *C10B 1/00* (2013.01); *C10L 5/44* (2013.01); *C10L 5/447* (2013.01); *F23G 2201/40* (2013.01); *Y02E 50/10* (2013.01); *Y02E 50/14* (2013.01); *Y02E 50/30* (2013.01)

(58) Field of Classification Search
CPC .... C10B 1/02; C10B 1/00; C10B 1/06; C10B 1/08; C10B 49/04; C10B 49/06; C10B 49/08; C10B 49/10; C10B 49/12; C10L 5/44; C10L 5/442; C10L 5/445; C10L 5/447; F23N 5/003; F23N 5/006; Y02E 50/15; Y02E 50/14
USPC .................................................. 202/209, 211
See application file for complete search history.

(56) References Cited

U.S. PATENT DOCUMENTS

| | | | |
|---|---|---|---|
| 3,595,181 A | 7/1971 | Anderson et al. | |
| 3,695,192 A | 10/1972 | Von Brimer | |
| 3,777,676 A | 12/1973 | Lagen | |
| 4,117,826 A | 10/1978 | Bette | |
| 4,167,909 A | 9/1979 | Dauvergne | |
| 4,261,269 A | 4/1981 | Mallek et al. | |
| 4,419,942 A | 12/1983 | Johnson | |
| 4,810,385 A | 3/1989 | Hater et al. | |
| 5,014,680 A | 5/1991 | Siemer | |
| 5,018,458 A | 5/1991 | McIntyre et al. | |
| 5,160,259 A | 11/1992 | O'Hara et al. | |
| 5,190,901 A * | 3/1993 | Hirai | C01B 31/086 201/19 |
| 5,499,622 A | 3/1996 | Woods | |
| 5,770,079 A | 6/1998 | Haase | |
| 5,799,590 A | 9/1998 | Noguchi | |
| 5,968,320 A | 10/1999 | Sprague | |
| 6,484,714 B1 | 11/2002 | Smith | |
| 6,790,317 B2 * | 9/2004 | Antal, Jr. | C10B 1/04 201/21 |
| 7,354,557 B2 * | 4/2008 | Muramatsu | C10B 49/02 422/152 |
| 7,371,308 B1 * | 5/2008 | Hackl | C10B 1/04 201/25 |
| 7,381,333 B1 | 6/2008 | Rainer | |
| 7,399,458 B1 * | 7/2008 | Martin | B01D 53/8646 110/185 |
| 7,458,809 B2 | 12/2008 | Hohenshelt et al. | |
| 7,678,176 B2 | 3/2010 | Whitten et al. | |
| 8,100,990 B2 | 1/2012 | Ellens et al. | |
| 8,287,728 B2 | 10/2012 | Kania et al. | |
| 8,361,186 B1 | 1/2013 | Shearer et al. | |
| 8,419,812 B2 * | 4/2013 | Ershag | C10B 1/04 48/67 |
| 8,512,644 B1 | 8/2013 | Maganas | |
| 8,673,150 B2 | 3/2014 | Pearson | |
| 8,747,797 B2 | 6/2014 | Shearer et al. | |
| 8,812,162 B2 * | 8/2014 | Schneider | F23B 90/08 110/190 |
| 8,986,507 B2 * | 3/2015 | Schottdorf | C10B 39/02 201/3 |
| 9,139,790 B2 * | 9/2015 | Taniguro | C10L 5/42 |
| 9,321,966 B2 * | 4/2016 | Wang | C10B 49/02 |
| 9,725,371 B2 | 8/2017 | Shearer et al. | |
| 9,752,078 B2 * | 9/2017 | Aupperle | C10B 1/02 |
| 9,878,301 B1 | 1/2018 | Kinsman et al. | |
| 9,878,924 B2 | 1/2018 | Beierwaltes et al. | |
| 9,975,792 B2 | 5/2018 | Thorgersen et al. | |
| 2003/0024165 A1 * | 2/2003 | Antal, Jr. | C10B 1/04 48/209 |
| 2003/0034286 A1 | 2/2003 | Butler | |
| 2003/0136734 A1 | 7/2003 | Mirzayi et al. | |
| 2004/0178052 A1 * | 9/2004 | Antal, Jr. | C10B 1/04 201/25 |
| 2005/0051918 A1 * | 3/2005 | Muramatsu | C10B 49/02 264/29.7 |
| 2008/0223269 A1 * | 9/2008 | Paoluccio | C10L 5/44 110/342 |
| 2009/0211892 A1 * | 8/2009 | Cunningham | B29B 17/02 201/25 |
| 2009/0215375 A1 | 8/2009 | Hagensen | |
| 2010/0031571 A1 * | 2/2010 | Ershag | C10B 1/04 48/123 |
| 2010/0120128 A1 | 5/2010 | Liang | |
| 2011/0100272 A1 | 5/2011 | Hasselbring et al. | |
| 2011/0114144 A1 | 5/2011 | Green et al. | |
| 2011/0172092 A1 | 7/2011 | Lee et al. | |
| 2011/0252699 A1 | 10/2011 | Britton | |
| 2012/0079762 A1 * | 4/2012 | Schottdorf | C10B 39/02 44/606 |
| 2012/0116589 A1 * | 5/2012 | Schneider | F23B 90/08 700/274 |
| 2012/0193212 A1 * | 8/2012 | Taniguro | C10B 49/02 201/14 |
| 2012/0237994 A1 | 9/2012 | Das et al. | |
| 2012/0304718 A1 | 12/2012 | Cheiky et al. | |
| 2012/0305380 A1 * | 12/2012 | Wang | C10B 49/02 201/25 |
| 2013/0068690 A1 | 3/2013 | McCord et al. | |
| 2013/0341175 A1 | 12/2013 | Linden et al. | |
| 2013/0341176 A1 | 12/2013 | Filho | |
| 2014/0151296 A1 | 6/2014 | Moore et al. | |
| 2014/0323297 A1 | 10/2014 | Harman et al. | |
| 2015/0040804 A1 | 2/2015 | Aupperle | |
| 2015/0136581 A1 | 5/2015 | Aupperle | |
| 2015/0144564 A1 | 5/2015 | Moller et al. | |
| 2015/0219341 A1 | 8/2015 | Yun | |
| 2015/0237813 A1 | 8/2015 | Field | |
| 2016/0075567 A1 | 3/2016 | Tour et al. | |

(56) References Cited

U.S. PATENT DOCUMENTS

| | | | |
|---|---|---|---|
| 2016/0211041 A1 | 7/2016 | Maganas | |
| 2016/0229709 A1 | 8/2016 | Beierwaltes | |
| 2017/0055502 A1 | 3/2017 | Gagliano et al. | |
| 2017/0283703 A1* | 10/2017 | Olander | C10B 1/02 |
| 2017/0283704 A1* | 10/2017 | Olander | C10B 1/02 |
| 2017/0369785 A1* | 12/2017 | Aupperle | C10B 1/02 |
| 2018/0072953 A1* | 3/2018 | Aupperle | C10B 1/02 |
| 2018/0072954 A1* | 3/2018 | Aupperle | C10B 1/02 |
| 2018/0105437 A1 | 4/2018 | Beierwaltes et al. | |
| 2018/0282628 A1 | 10/2018 | Aupperle et al. | |
| 2018/0282629 A1 | 10/2018 | Aupperle et al. | |
| 2018/0282630 A1 | 10/2018 | Aupperle et al. | |
| 2018/0327329 A1 | 11/2018 | Bontchev et al. | |

FOREIGN PATENT DOCUMENTS

| | | |
|---|---|---|
| WO | 2006/117006 A1 | 11/2006 |
| WO | 2010/122525 A1 | 10/2010 |
| WO | 2010/129996 A1 | 11/2010 |
| WO | WO 2011097183 | 8/2011 |
| WO | 2011/143718 A1 | 11/2011 |
| WO | WO 2012061795 | 5/2012 |
| WO | WO 2013126477 | 8/2013 |
| WO | WO 2013152337 | 10/2013 |
| WO | WO 2014059141 | 4/2014 |
| WO | WO 2014170670 | 11/2014 |
| WO | WO 2014179670 | 11/2014 |

OTHER PUBLICATIONS

International Search Report and Written Opinion for International Application No. PCT/US2013/025999 dated Jun. 12, 2013, 8 pp.

International Search Report and Written Opinion for International Application No. PCT/US2013/030079 dated Jun. 18, 2013, 3 pp.

English Abstract of JP 4267968, May 27, 2009, 2 pp.

Machine Translation of KR-10-2002-0010902, obtained from KIPRIS, Feb. 6, 2002, 83 pp.

International Preliminary Report on Patentability for International Application No. PCT/US2013/030079, dated Aug. 19, 2014, 5 pp.

International Preliminary Report on Patentability for International Application No. PCT/US2013/025999, dated Aug. 19, 2014, 5 pp.

International Search Report and the Written Opinion for app. No. PCT/US2016/015943 dated Jun. 9, 2016, 11 pgs.

International Preliminary Report on Patentability for International Application No. PCT/US2016/015943, dated Aug. 8, 2017, 7 pp.

Co-owned U.S. Appl. No. 15/997,418, filed Jun. 4, 2018.

Co-owned U.S. Appl. No. 15/997,440, filed Jun. 4, 2018.

Co-owned U.S. Appl. No. 15/997,367, filed Jun. 4, 2018.

Co-owned U.S. Appl. No. 16/149,789, filed Oct. 2, 2018.

Sugarman, Joe, "Is it Safe to Swim in the Chesapeake Bay?", Washingtonian Magazine, Jun. 28, 2016 (downloaded Dec. 31, 2018), 21 pages, Washington, D.C.

Greenyarn—Technology in Nature, www.greenyarn.com, Copyright 2005 (downloaded Dec. 31, 2018), 5 pages, Greenyarn LLC, Boston, Massachusetts.

www.reddit.com, "Are you supposed to wear underwear under swim trunks?", blog conversation dated 2015 (downloaded Dec. 31, 2018), 8 pages.

Schmidt, Hans-Peter, "Novel Uses of Biochar-a key technology for the future of the planet," downloaded from https://scholarworks.umass.edu/biochar/2013/Benefits/7/ (downloaded Dec. 31, 2018), 106 pages.

USEPA technical report "Toxic Contaminants in the Chesapeake By and Its Watershed; Extent and Severity of Occurrence and Potential Biological Effects," Technical Report Dec. 2012, p. 44-59, Annapolis, Maryland.

Yao, Ying, et al., "Effect of biochar amendment on sorption and leaching of nitrate, ammonium, and phosphate in a sandy soil," Chemosphere, 2012, pp. 1467-1471, vol. 89, Elsevier, Gainesville, Florida.

Wang, Zhanghong, et al. Biochar produced from oak sawdust by Lanthanum (La)-involved pyrolysis for adsorption of ammonium (NH4+), nitrate (NO3-), and phosphate (PO3/4-), Chemosphere, 2015, pp. 646-653, vol. 119, Elsevier, China.

* cited by examiner

CONTROLLED KILN AND MANUFACTURING SYSTEM FOR BIOCHAR PRODUCTION

CROSS REFERENCE TO RELATED APPLICATIONS

This application claims the priority benefit of U.S. Provisional Patent Application Nos. 61/599,906 filed Feb. 16, 2012 for "Biochar kiln with catalytic converter," 61/599,910 filed Feb. 16, 2012 for "Process completion detection for biochar kiln," and 61/604,469 filed Feb. 28, 2012 for "Biochar manufacturing process," each of which is incorporated by reference in their entirety as though fully set forth herein.

BACKGROUND

Biochar is made from biomass (trees, agricultural waste, etc.) in an oxygen-deprived, high temperature environment. Quality biochar has high purity, absorptivity and cation exchange capacity which provide significant benefits to several large markets including agriculture, pollution remediation, odor sequestration, separation of gases, oil and gas clean up, and more.

SUMMARY

Biochar production is disclosed herein, wherein a managed or controlled biochar kiln can be used itself and/or as part of a managed or controlled biochar manufacturing system (or production plant) to produce a quality biochar product. An example of the controlled biochar kiln includes a drum, a lid and a floor together forming a combustion chamber configured to contain feedstock for conversion into biochar. An inlet pipe (also referred to as the primary air inlet pipe) is configured to accept airflow into the combustion chamber and an outlet is configured to release smoke and other exhaust from the combustion chamber. The biochar kiln may be managed or controlled, for example, by controlling temperature, airflow, air mixing, emissions, operations reliability, and biochar product quality and other characteristics. For example, the biochar kiln may be managed or controlled by various subsystem(s), such as but not limited to, dampers, blowers, heat controls, air flow controls, mixers, monitors/sensors, computerized operating algorithms, alarms/notifications, and automated controls.

In an example, one or more catalytic converters may be operatively coupled with the outlet to reduce or eliminate smoke, odor and/or other emissions. The catalytic converter may be configured to incinerate emissions (e.g., toxins and greenhouse gases including particulate matter, CO, mold spores, various VOCs, and some hydrocarbons and NOX). The catalytic converter may itself be a managed catalytic converter (e.g., controlling temperature, airflow, and other operating parameters of the catalytic converter) to enhance operation and increase lifecycle (e.g., by not burning off the active coating).

In another example of controls which may be implemented, the biochar kiln may include a process completion subsystem. An example process completion subsystem includes a sensor configured to detect a condition of a catalytic converter operatively coupled to the biochar kiln, and a notification generator configured to issue notification(s) upon detection by the sensor of various condition(s).

An example of the biochar manufacturing system includes portable biochar kiln(s), a feedstock filling station for providing feedstock to a biochar kiln, a firing line for receiving a biochar kiln containing feedstock, a tipping station for receiving biochar from a biochar kiln, a crushing station to size the biochar and an automated handler configured to grasp and move the biochar kiln between the feedstock filling station, the firing line and the tipping station. The automated handler may move the kiln itself, lift the kiln onto a trailer or other transporter for towing around to the workstations. In another example, the automated handler may be a travelling hoist system.

DETAILED DESCRIPTION

Figure 1:
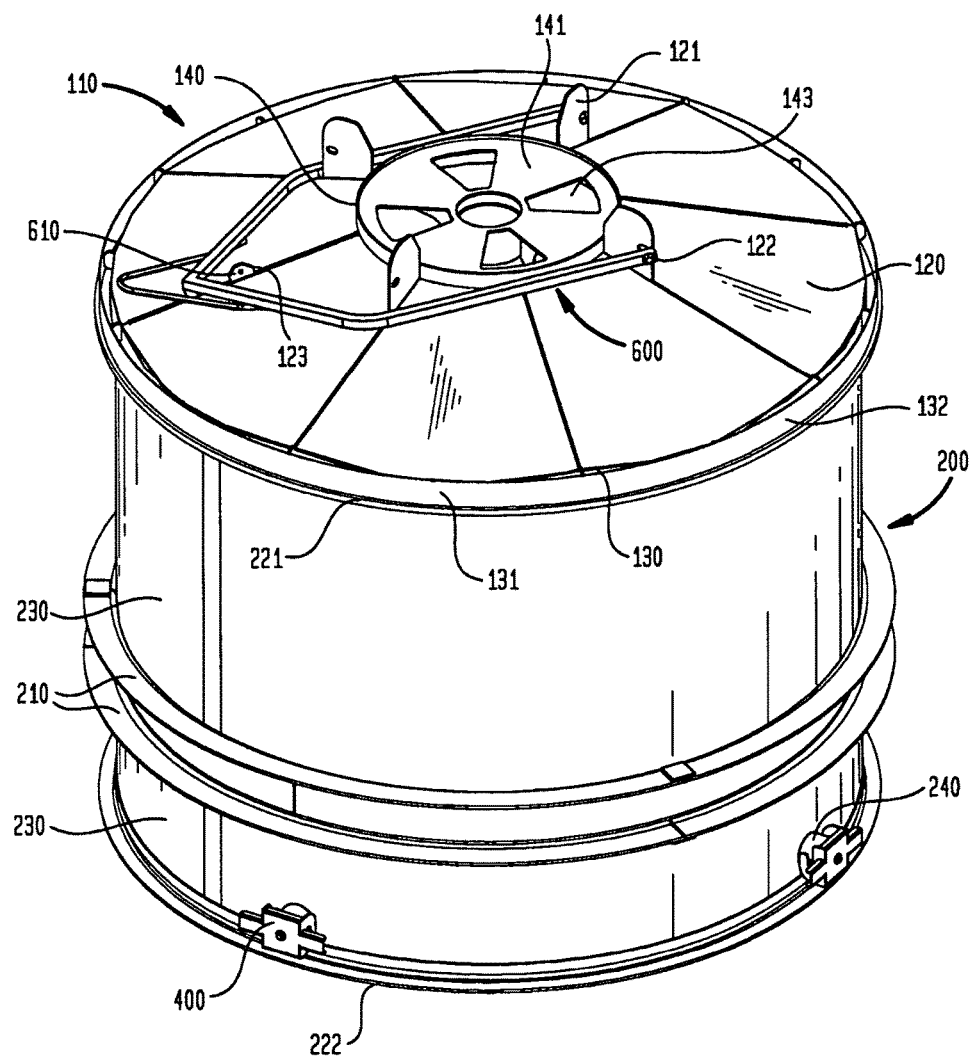
FIG. 1 illustrates a side perspective view of an example controlled kiln which may be used by itself or as part of a production plant for biochar production.

When char is produced from biomass feedstock, the char is referred to as "biochar." The biochar described herein is a unique carbon product created in a low oxygen or oxygen-deprived, high-heat environment. Limited oxygen prevents combustion and instead of simply burning the biomass, converts the biomass to a structured biochar product exhibiting special physiosorptive and/or chemisorptive properties. The biochar product is a high-carbon, fine-grain product of pyrolysis (i.e., the direct thermal decomposition of biomass in a deprived oxygen environment to yield biochar products).

The relative quality and quantity of biochar product yielding from pyrolysis varies with process conditions (e.g., temperature). For example, pyrolysis controlled temperatures tend to produce a higher quality biochar, while erratic temperatures tend to yield unfinished product, more smoke, and/or more undesired liquid and gas emissions. Other process parameters also affect characteristics of the biochar product. For example, low temperatures may provide higher yields, but may also reduce the adsorption capacity of the biochar.

The biochar product may have very high adsorption capabilities (e.g., an affinity for vapor and aqueous phase molecules). The biochar may also possess cation and/or anion exchange capabilities that attract and sequester molecules, providing unique benefits. For example, markets for the biochar include, but are not limited to, agriculture uses, odor control, animal feed supplements, removal of mercury, heavy metals, toxins, organics, and/or other contaminants from industrial processes (e.g., coal power plant stack emissions or waste water such as that derived from oil and gas production and drilling), mitigation of oil spills, removal of excessive fertilizer from field run offs, sequestration of e-coli, phosphorus and other contaminants from drinking water, and containment of mine tailing contaminants, to name only a few examples.

The biochar product is also a stable solid which can endure in soil for many years. As such, the biochar product can be used to sequester fertilizer nutrients and water, which reduces leaching of nutrients from the soil and makes nutrients more readily available to plants. The biochar product can be used as a soil amendment or additive to improve crop yield, improve water moisture availability, reduce soil emissions of nutrients and greenhouse gases, reduce nutrient dispersion and leaching, improve soil pH, and reduce irrigation and fertilizer requirements. Biochar used in soil also helps reduce the need for externally applied fertilizers, thereby reducing cost and emissions from fertilizer production and transport. In addition, biochar enhances soils so that the same soil can be used potentially indefinitely to sustain agriculture. Biochar also provides soil microbial domiciles to protect the microbes from predators and weather (e.g., rains, drainage, and drought).

The biochar product can also be used to decrease fertilizer run-off by operation of the same sequestration mechanism. That is, the biochar can sequester contaminants in a highly stable form, thereby reducing soil contaminant uptake by plants. Biochar can also sequester nitrogen and methane in the soil, thereby reducing emissions from the soil.

The biochar product can be applied to fields using conventionally available machinery or equipment such as that used to apply fertilizer. The biochar can be mixed with manures, compost or fertilizers and included in the soil without the need for additional equipment. Biochar has been shown to improve the structure and fertility of soils, thereby improving biomass production, which can in turn be used in the pyrolysis process to generate more biochar.

While the benefits of biochar may depend to some extent on external factors, such as environmental conditions (e.g., temperature and humidity) where the biochar product is being used, the specific benefits of the biochar produced according to the systems and methods described herein are at least somewhat dependent on the properties of the biochar itself. Accordingly, the systems and methods described herein may be used to specifically design biochar products to target various end-uses.

Before continuing, it is noted that as used herein, the terms "includes" and "including" mean, but are not limited to, "includes" or "including" and "includes at least" or "including at least." The term "based on" means "based on" and "based at least in part on."

FIGS. 1-7 illustrate various aspects of an example biochar kiln 100. It is noted that the biochar kiln is not limited to the one shown in the figures. Variations are also contemplated as being within the scope of the claims, as will be readily apparent to those having ordinary skill in the art after becoming familiar with the teachings herein.

In the example shown, the kiln 100 includes a lid 110 a drum 200 comprised of walls 230 and bottom 250. Lid 110 is formed to be fitted to a top edge of drum walls 230 to close the top end of drum walls 230 with lid 120 and form a combustion chamber between lid 110, walls 230, floor 250. As shown, lid 110 and lid 120 have planar circular shapes. However, lid 110 and lid 120 may take any of variety of shapes which allow a relatively close fit of lid 110 with drum walls 230. In some examples, lid 120 may be formed from a plurality of panel segments (e.g., eight panels, joined at adjacent side edges).

As depicted by way of example in FIG. 1, lid 110 includes a lid flange 130 around the circumferential edge of lid 120 formed to fit over a top edge of drum walls 230. A gasket or other suitable retainer ring 132 may be provided around and separated from lid flange 130 by spoke tabs 131 (e.g., a high temp gasket rope which is compressed between the lid edge and top flange of the drum). Stack guide plates 121 extend from a top surface of lid 120. Two or more stack guide plates may include through-holes for receipt of a pipe/bail bushing 122 for use with lid bail 600, described in detail below. Chain plates 123 may also be formed to extend from top surface of lid 120 and include chain plate holes 124 configured to receive bail chains used to facilitate lifting.

Figure 7:
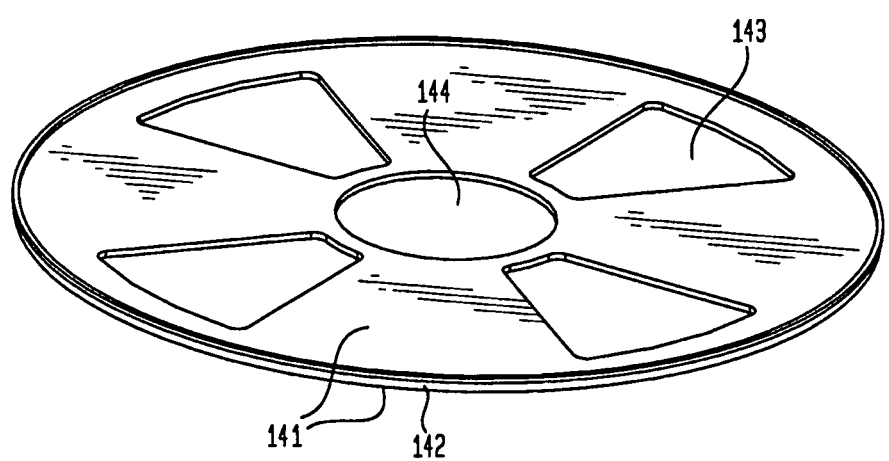
FIG. 7 illustrates an example of a lid stack plate for use with the example biochar kiln of FIGS. 1-5.

A lid collar 140 is provided surrounding a central opening in lid 120. A lid stack valve plate 141 is fitted into the central opening and includes radial openings 143 and center opening 144. A lid seal ring 142, depicted in detail in FIG. 7, provided to a top surface of stack valve plate 141 is designed to enhance the seal of stack valve plate 141 with lid collar 140. In use, stack valve plate 141 regulates outlet of smoke from the combustion chamber through center opening 144. At an underside of lid 110, lid centering guides 145 extend radially inward from inner surface of lid collar 140 to meet with lid stack sleeve 146 provided for fitting with center stack 300, as described in detail below.

The lid 110 is designed to mate with an upper end of drum 200 to contribute to forming a combustion chamber. Drum 200 includes a walls 230 formed generally as a cylinder having top and bottom ends. In the example illustrated, walls 230 is a cylinder with a circular base. However, the base of walls 230 may take any of a variety of shapes which allow for a relatively close fit with lid 110 and floor 250.

In an example, walls 230 may be constructed of a plurality of individual pieces. For example, two half-shells may be joined together during kiln assembly. In such an example, the pieces may be joined according to a process appropriate for the material of construction of the pieces. For example, if walls 230 are formed of metal, the pieces may be welded together.

A channel grab ring 210 is formed on an exterior surface of drum 200 to facilitate gripping of kiln 100 by an automated handler, as described in detail below. Channel grab ring 210 may include upper 221 and lower 222 support rings to guide grippers of an automated handler into a channel formed therebetween. Pipes 240 may be provided to extend through walls 230 between exterior and interior sides to provide inlets for accepting limited airflow into the combustion chamber.

Pipes 240 are referred to herein as the primary air vents, and allow outside air to enter the burn chamber and feed the fire. However, after the initial firing (e.g., propane "weed-burning" torches may be inserted into each vent hole to start a fire in each quadrant of the burn chamber, an external damper and/or blower pipes may be attached to the vent collars. Although the damper is referred to herein as controlling the primary air, a constant speed blower may be provided at the outside end of the damper pipe that provides forced air that's varied by the damper and/or computer controller. In another example, a variable speed blower may be used without a damper. In yet another example, a damper may be used without any blower.

These damper and/or blower pipes can be computer controlled to provide any desired amount of the blower air by changing the damper valve position, allowing the operator to provide local fire control in each quadrant. If the overall fire is delivering too much heat and/or smoke to the stack and cat, the operator can back off on the kiln fire. In another example, if one quadrant is racing ahead of the others, the operator can limit air in a particular quadrant while increasing air to the other quadrant's to even out the burn.

Figure 2:
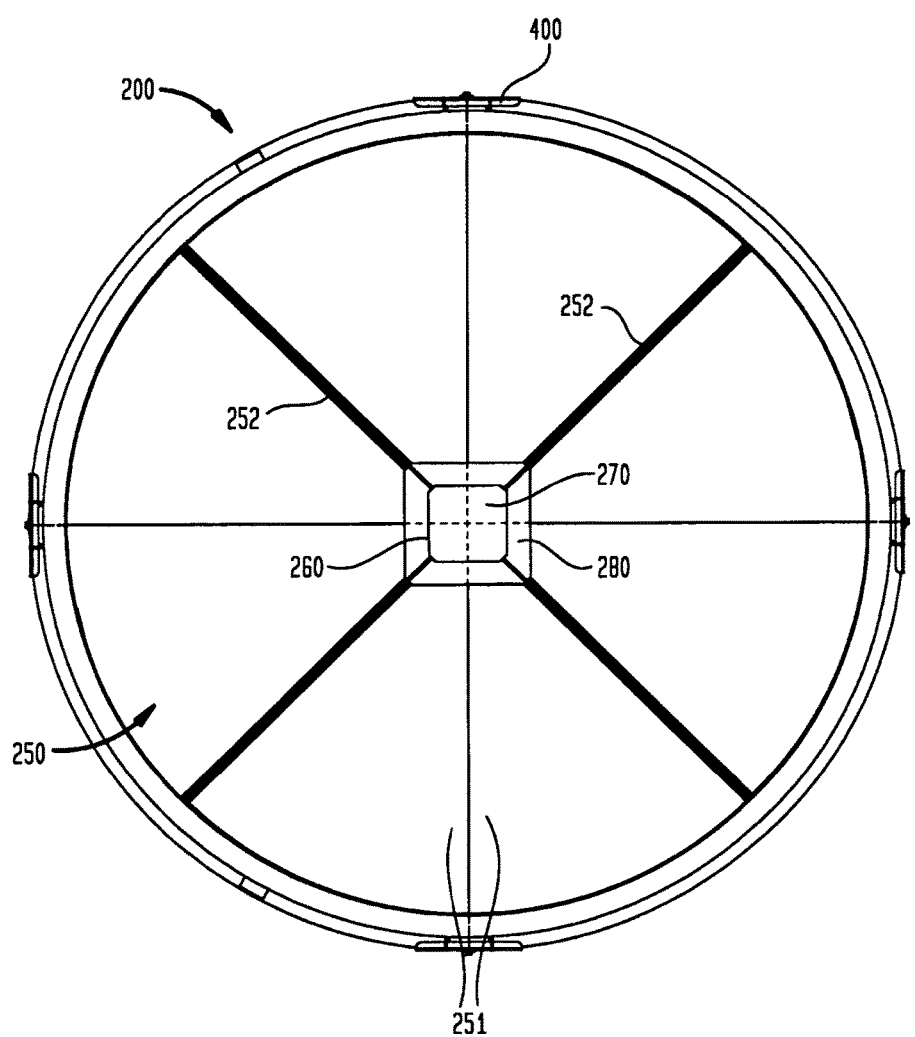
FIG. 2 illustrates a bottom view of the example biochar kiln of FIG. 1.

As depicted by way of example in FIG. 2, floor 250 is formed to be fitted to bottom edge of drum walls 230 to close the bottom end of drum walls 230 and form the previously mentioned combustion chamber between bottom 250, walls 230 and lid 110. As shown, floor 250 has a planar circular shape. However, floor 250 may take any of variety of shapes, which allow a relatively close fit of floor 250 with drum walls 230. In some embodiments, floor 250 may be formed from a plurality of panel segments 251, for example eight panels, joined at adjacent side edges. Floor ribs 252 are shown extending radially inward from the outer circumference of floor 250 to an air inlet pipe 270 extending through a center opening in floor 250.

It is noted that the low points on the floor may be substantially lined up with inlet air vents to permit drainage of liquid creosote, wood vinegars, water and/or other liquids. Ribs 252 provide added structural integrity to floor 250. A bottom tie plate 260 is provided spaced apart from floor 250 by ribs 252. A stack mount plate 280 is also provided. In an example, bottom tie plate 260 may be used to join the floor stiffeners. The bottom tie plate 260 may also be removed, for example, to add a center mounted blower air pipe or to reduce manufacturing costs.

Figure 3:
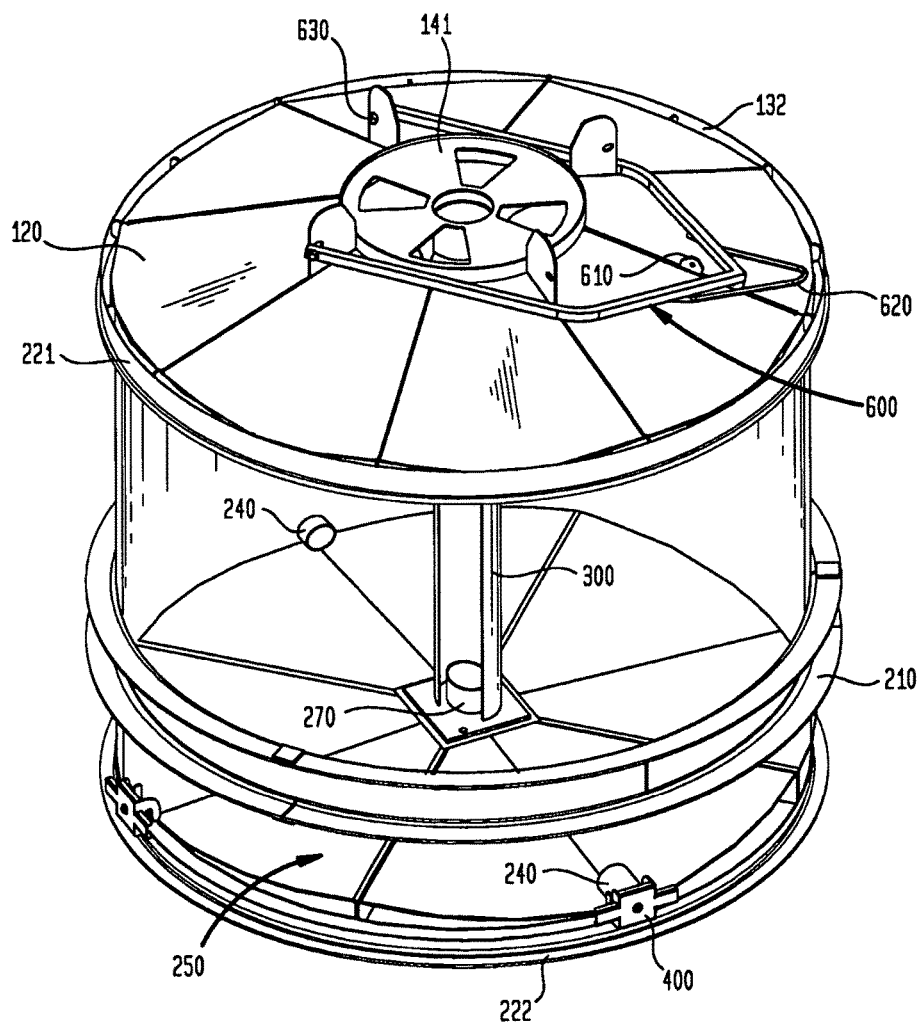
FIG. 3 illustrates a partial cut-away of a side perspective view of the example biochar kiln of FIGS. 1 and 2.

An example is shown in FIGS. 2 and 3 that the floor may be sloped to facilitate draining of liquid buildup inside the kiln out through the air vents 400. Liquid buildup may be from burning wet wood, and or include "wood vinegar" (derived from the wood, volatiles, and liquid creosote).

Figure 4:
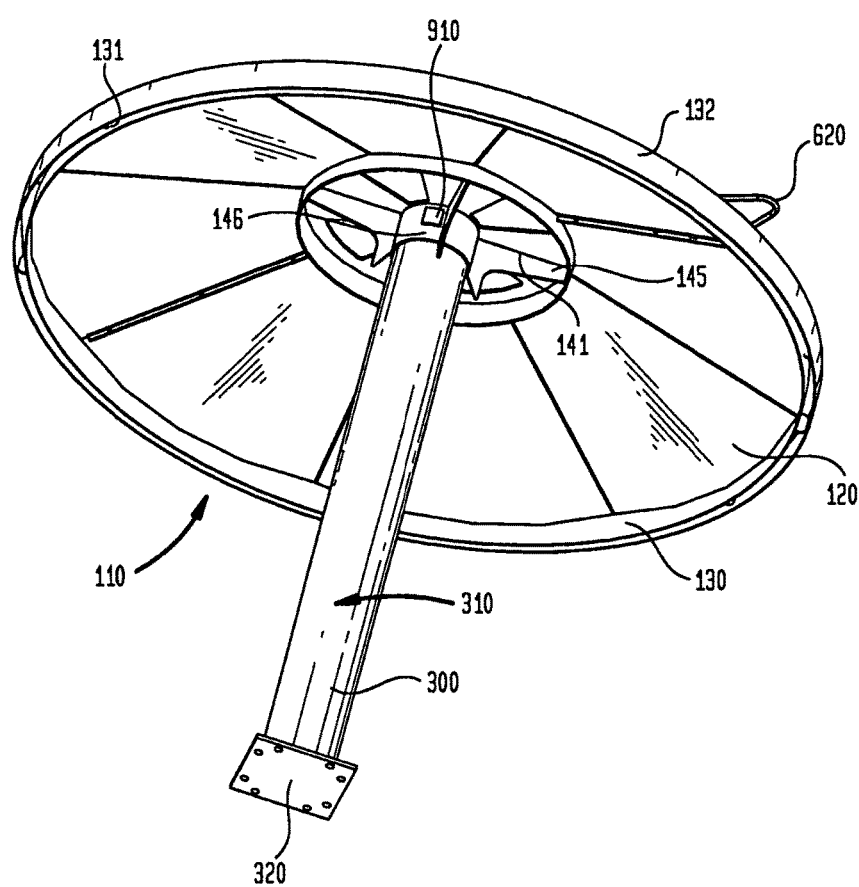
FIG. 4 illustrates a cut-away side perspective view of the example biochar kiln of FIGS. 1-3 emphasizing a center stack component.

A center stack 300 is depicted by way of example in FIGS. 3 and 4, as the stack 300 may extend within the combustion chamber between the center opening of lid 110 and the center opening of floor 250. Center stack 300 has a generally cylindrical shape with an open channel 310 along once side extending between top and bottom ends. In use, a top end of center stack 300 is mated to 146 while a bottom end is partially encompasses air inlet pipe 270 and is mated to center stack bottom plate 320.

Figure 6:
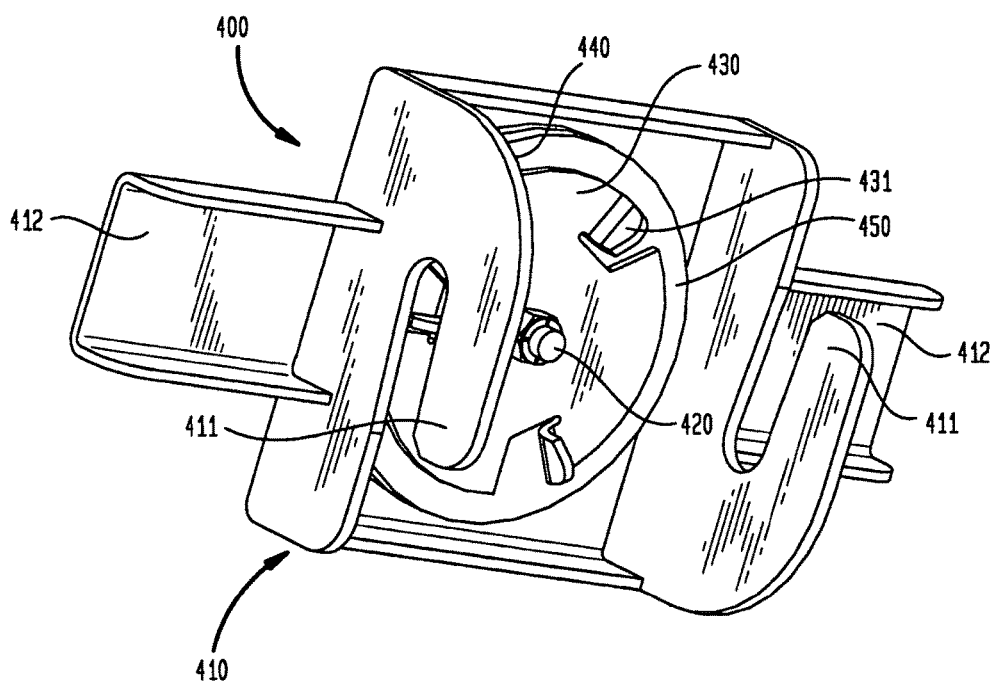
FIG. 6 illustrates a perspective view of an example sealing cover for use with the example biochar kiln of FIGS. 1-5.

As illustrated by way of example in FIG. 6, a plurality of sealing covers 400 are provided to operatively engage pipes 240. Sealing covers 400 include a handle plate weldment 410 provided with fingers 411 and handles 421, and in this example, a seal cover bolt assembly 420 provided with hex bolt 421, washer 422, nut 423 and self-locking nut 424. Sealing covers 400 further include sealing cover centering guide 430 with flanges 431, sealing cover backing plate 440 and sealing cover center plate 450. In use, center plate 450 is pressed between centering guide 430 and backing plate 440. Cam screw assemblies 500 may include cam screws 501.

Figure 5:
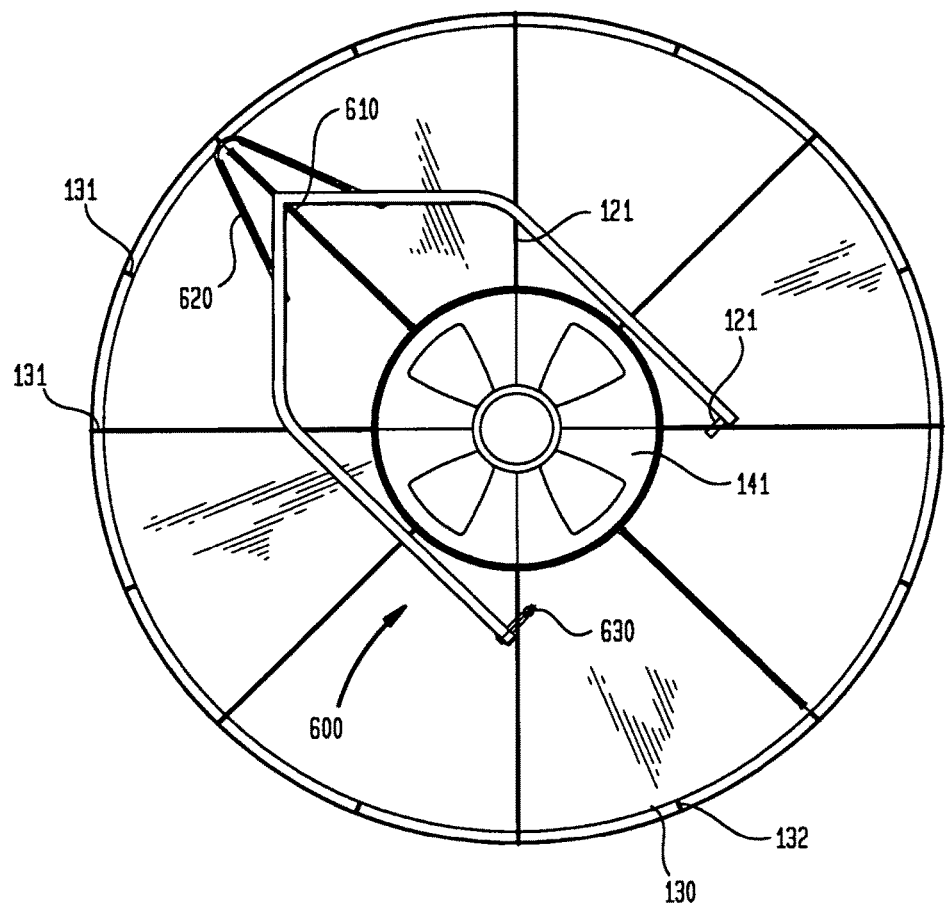
FIG. 5 illustrates a top view of the example biochar kiln of FIGS. 1-4.

As depicted by way of example in FIG. 5, lid bail 600 may be hingedly engaged with stack guide plates 121 bushings 122 and bail pivot bolt assembly 630 including hex bolt 631, nut 632 and washer 633. Bail chain plate 610 provides an opening for receipt of a bail chain for securing bail bar 620 to prevent pivoting of lid bail 600. Lid bail 600 is provided to facilitate lifting of kiln lid 110 to remove lid 110 from drum 200 and open kiln 100.

Kiln 100 may be manufactured of steel and/or other material(s) and may be designed to be unassembled, relocated, and then reassembled or as a unitary structure. Kiln 100 may be constructed to a variety of dimensions but may be, for example, approximately 1 m in height.

The kiln 100 may be configured to receive any of a variety of feedstock. In an example, the kiln 100 is configured as a wood burning kiln (e.g., using beetle kill pine trees prevalent in much of the western United States). In any event, feedstock may be burned in the kiln to provide a self-sustaining energy such that little or even no external heat is needed.

While in an example, the biochar kiln 100 may be operated with no external heat source, in another example, a central chamber containing biomass feedstock may be heated externally using a supplemental energy source, such as by gas, electricity and/or other biomass heat sources.

Based at least in part on the feedstock characteristics, the conversion pyrolysis may release carbon dioxide, black carbon, carbon monoxide, and other greenhouse gases into the air in the form of smoke, contaminants, and odors. Therefore, for biochar production to work on a commercially viable scale, the kiln described herein may implement effective capture and mitigation techniques for the exhaust gases.

Supplemental combustion chamber(s) and/or baffling may be used. As an alternative, or in addition thereto, a catalytic converter 700 may be provided to reduce or altogether eliminate smoke and/or odor emissions into the surrounding environment and/or atmosphere. In an example, stack valve plate 141 may be used for this purpose, and also to reduce the associated fire hazard of embers emitted from the biochar kiln by incineration.

Figure 8:
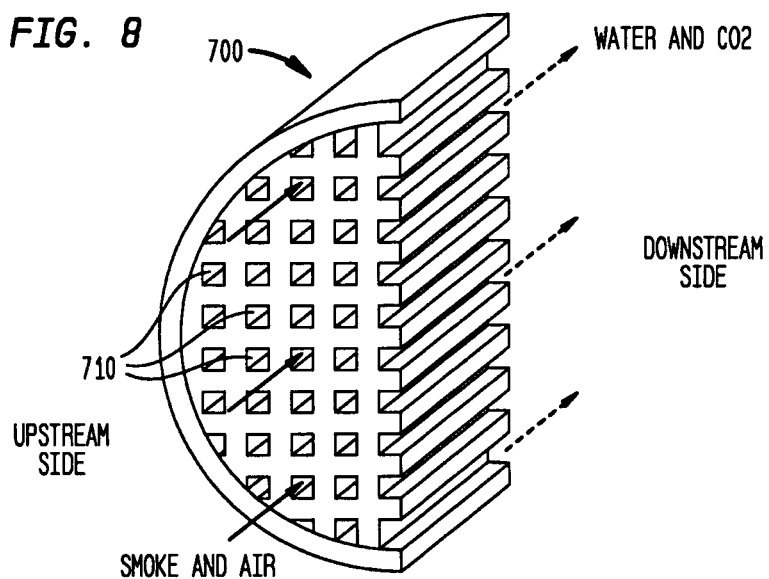
FIG. 8 illustrates a perspective section view of an example catalytic converter for use with the example biochar kiln of FIGS. 1-5.

FIG. 8 illustrates a perspective section view of an example catalytic converter for use with biochar kiln 100. A catalytic converter 700 (also referred to as a combustor or a secondary combustor) may be configured to fit within center stack 300 near the center opening of lid 110 of biochar kiln 100, such that exiting smoke passes through catalytic converter 700. As the smoke passes through the catalytic converter, the smoke particulate is incinerated at a high temperature (e.g., 1700° F. or higher, and at least higher than the pyrolysis temperature), thus enabling the smoke itself to be incinerated prior to being emitted from the biochar kiln.

As such, use of a catalytic converter may help comply with government environmental standards. For example, using a catalytic converter may allow an installation to operate a large number of kilns (e.g., 200 kilns or more at one site) at substantially the same time.

In an example, the catalytic converter 700 includes channels 710 as part of its internal chamber structure through which air (e.g., including oxygen) and smoke (e.g., including hydrocarbons and other carbon byproducts such as carbon monoxide) pass after entering catalytic converter 700 from the combustion chamber. In an example, the exhaust includes water vapor and $CO_2$ exiting on a downstream side of channels 710.

Catalytic converter 700 may be made of any suitable material, such as chemically treated metals (e.g., depositions of Platinum and Palladium), ceramic, or combinations thereof. In some embodiments, catalytic converter 700 is formed as a disk measuring from approximately 15 to approximately 30 centimeters (cm) in diameter, and from approximately 2.5 to approximately 8 cm in thickness. However, catalytic converter 700 may be formed to have any of a variety of dimensions enabling it to fit well within any outlet of the kiln 100.

Catalytic converter 700 is configured for operating conditions of the biochar kiln with which it is used and is not limited to the structure shown but, instead, may adopt any of a variety of structures appropriate for incinerating smoke produced in the combustion chamber. Catalytic converter may take a variety of shapes. In some embodiments, catalytic converter 700 is configured to assist in containing airborne embers and reduce fire hazard associated therewith.

During incineration, fuel in the form of smoke and oxygen in the form of air is provided to catalytic converter 700 and no moving parts or external power are required for operation. Even if the smoke input temperature drops as low as 100° F., catalytic converter 700 continues to function properly if there is enough smoke and air to support incineration.

Catalytic converters may operate optimally at controlled temperatures. Temperatures may be controlled using pre-heating, or by waiting until the combustion chamber is sufficiently heated on its own. When the smoke is not sufficiently hot, supplemental heating may be used to pre-heat the catalytic converter 700. For example, the catalytic converter 700 may be preheated to a desired temperature in a range of about 350-1600° F. before lighting the kiln 100, for example, by inserting a propane torch into an opening near the bottom of the catalytic converter.

In another example, catalytic converter 700 may be preheated using a (e.g., gas) furnace burner supplied within the combustion chamber near catalytic converter 700. The furnace burner may be cycled on and off by a computer. For example, the burner may alternatively take the form of a small basket of burning biochar or charcoal placed below the catalytic converter 700 and ignited to preheat the catalytic converter. If heat generated in the combustion chamber of the biochar kiln and the smoke is sufficiently hot, catalytic converter 700 may be operated without any preheating.

Catalytic converter 700 may also be implemented as part of a process detection subsystem to determine when biochar production is complete. Air temperature above catalytic converter 700 may be monitored to detect a transition from a slow pyrolysis phase to a shut-down phase. The monitoring subsystem may be at any suitable location and/or distributed at various locations.

As mentioned above, the temperature of a catalytic converter may drop when denied fuel and/or oxygen. When the feedstock is cooking out excessive organic matter and moisture, there may be plenty of smoke to fuel the catalytic converter. However, when the cooking stage begins to end (only biochar remaining), the amount of smoke is greatly reduced. As a result, the temperature of the catalytic converter may decrease due to a reduced fuel supply.

An air vent and damper and blower may be operated on the biochar kiln to provide additional air to the combustion chamber when input smoke to the catalytic converter does not have sufficient oxygen to support incineration of the smoke. The air vent and damper and blower may be automatically controlled via a feedback control loop. In an example, air vents and dampers and dampers are automatically controlled via a feedback control loop which monitors oxygen level, temperature, and/or other conditions at or near the catalytic converter(s), and operates the vent and/or damper and/or blower in response to changing conditions. In another example, the feedback control loop may issue a notification to a plant operator to manually control the air vent and damper and blower.

For purposes of illustration, during operation, in light mode, a burner as described above is used to preheat catalytic converter 700 core temperature to approximately 600° F. The pre-heat burner may be kept on until catalytic converter 700 reaches a temperature of greater than approximately 1000° F.

The temperature of catalytic converter 700 is controllable with the secondary air blower. If the flow rate of the secondary blower is already at maximum and is unable to provide enough air to cool the catalytic converter, then the four primary air vent dampers and blowers at the kiln's base can be manually or automatically limited to reduce heat and smoke emitted from the combustion chamber and the secondary blower motor speed can be reduced.

The catalytic converter 700 may be maintained at the desired operating temperature throughout the burn and cook modes to facilitate incineration of smoke and emissions. If the temperature of the catalytic converter 700 drops, the burner may be turned back on to keep catalytic converter 700 smoke free. Quadrants may be driven to equal temps using individual and blower controls.

During a cook mode of the process, heat is recirculated and volatile organic compounds are burned off. Again, the temperature of catalytic converter 700 can be managed to maintain the desired operating temperature(s). For example, a secondary air blower and primary air dampers and blowers, may be used to control the amount of fresh air provided to the catalytic converter and the combustion chamber respectively.

As volatile organic and other compounds are purged from the feedstock, kiln smoke declines such that catalytic converter 700 requires less secondary air and the blower rate is reduced. When secondary blower speed declines a predetermined amount, the char conversion is deemed to have been completed.

Ending the pyrolysis at the appropriate time can be important to obtain desired characteristics of the biochar product. Left to continue burning longer than needed, yield may be burned off. If the burning is shorter than needed, undercooked biochar may have lower adsorptive performance. Accordingly, a monitoring subsystem may be implemented to help ensure optimal biochar product yield (e.g., product characteristics and/or product volume).

A temperature drop can also be used as an indicator that the biochar conversion process is nearly complete. Accordingly, the temperature drop can be detected, and a notification can be issued to alert an operator that biochar conversion at or near completion.

Smoke coloration can also be used as an indicator of cooking stages. For example, white smoke emissions may indicate the presence of volatile organic carbons (VOCs) and/or moisture being cooked out, indicating that the biochar is not yet finished. A thin, blue-tinted smoke may indicate that the process has finished and that the biochar product itself is starting to burn.

In an example, the monitoring subsystem may include a weight or mass sensor. For example, the sensor may monitor mass of the biochar kiln. The monitored mass may be a gross weight, or a tarred mass (e.g., mass of the product loaded into the kiln minus mass of kiln itself). Generally, the mass of the feedstock will decrease as the feedstock is converted to biochar product. Accordingly, the sensor may be used to detect a predetermined mass indicating an optimal yield (e.g., that the feedstock has completely converted to biochar product).

Figure 9:
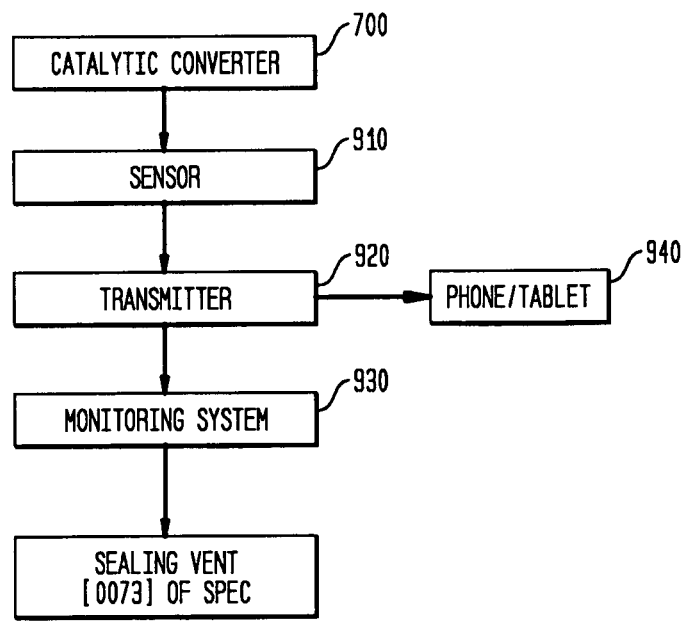
FIG. 9 illustrates a high-level schematic diagram of an example process completion detection subsystem.

The monitoring subsystem may include sensors to detect these and/or other operating conditions of the biochar kiln. In an example embodiment as depicted in FIG. 9, a monitoring subsystem may include a temperature sensor near catalytic converter 700 configured to monitor temperature of smoke entering and/or exiting catalytic converter 700, and/or the temperature of the catalytic converter itself.

A computing subsystem may be used to monitor the sensor measurements, e.g., comparing measurements to pre-established threshold(s). In an example, the burn finish condition temperature (e.g., as measured above the catalytic converter) is less than about 80% of normal operating temperatures (e.g., during cook mode) while the secondary air blower is operating at near zero air flow.

Notification(s) may be issued, for example, in response to the catalytic converter reaching to threshold temperature(s) or a range of threshold temperatures. The notification(s) may be, for example, in the form of an alarm or email issued to a plant operator using monitoring subsystem 930 and may be sent locally and/or wirelessly to remote devices such as smart phones or other electronic devices.

Before continuing, it should be noted that the examples described above are provided for purposes of illustration, and are not intended to be limiting. Other system and/or device configurations may be utilized to carry out the operations described herein.

Figure 10:
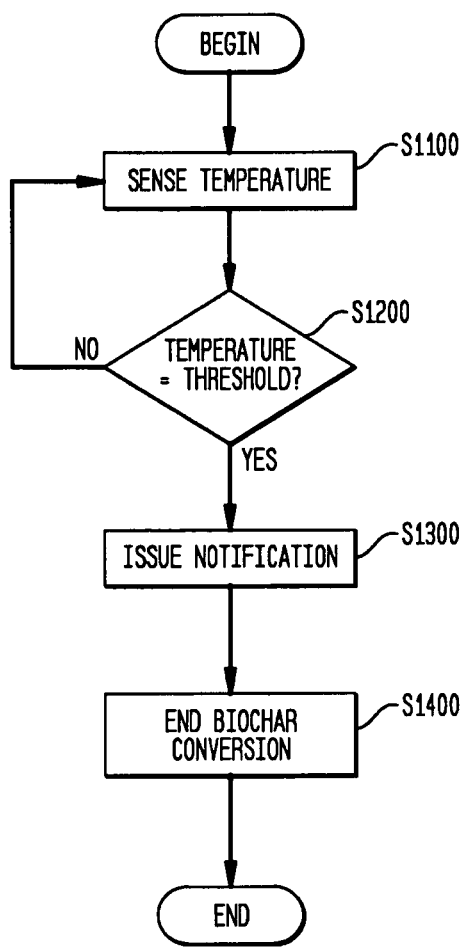
FIG. 10 illustrates an example flow diagram of a process for sensing completion of conversion of feedstock into biochar.

FIG. 10 is a flowchart showing example operations for process completion detection for a biochar kiln. The operations include, but are not limited to, sensing temperature near a catalytic converter receiving exhaust from a combustion chamber of the biochar kiln in step S1100; comparing the monitored temperature to a threshold in step S1200, the threshold indicating that the catalytic converter has reached a threshold temperature; and issuing a notification in step S1300 in response to a catalytic converter reaching the threshold temperature.

In an example, an auto-shutdown subsystem may be provided in step S1400 to shut down the biochar conversion process even when the biochar kiln is unmanned. For example, automatic shutdown may be enabled by closing and sealing vent and/or chimney ports with mechanical or electro-mechanical actuators to operate shutters for closing the ports. In an example, a detection subsystem may indicate the catalytic converter has decreased to at least 50% of an optimal operating temperature. In some embodiments, the notification may provide advance warning. In still other embodiments, a subsystem for conversion completion detection may detect phases a biochar kiln.

Having described examples of a biochar kiln and operation thereof, a production plant will now be described. It is noted that traditional production systems (whether those be for char production or otherwise), are often difficult to scale (e.g., convert from a small scale startup to large scale operations), because the components often have to be redesigned. Redesigning just about any type of production plant involves a lot of time, and cost a lot of money.

In an example, however, a biochar production plant can be readily scaled using the technologies described herein. For example, portable kilns such as the biochar kiln describe above, can be utilized in a plant layout having workstations configured to greatly improve the efficiency and production output of the biochar production process, while significantly lowering labor and production costs.

By way of illustration, a small, low cost, fully engineered production platform, including a portable biochar kiln, may be quickly and easily expanded. For example, a site can be readily started using a few biochar kilns. Once brought online, the biochar production plant can readily be scaled to any number of biochar kilns in short amount of time (e.g., depending on availability and transportation of the kilns). Multiple large-scale sites may also be quickly replicated.

Figure 14:
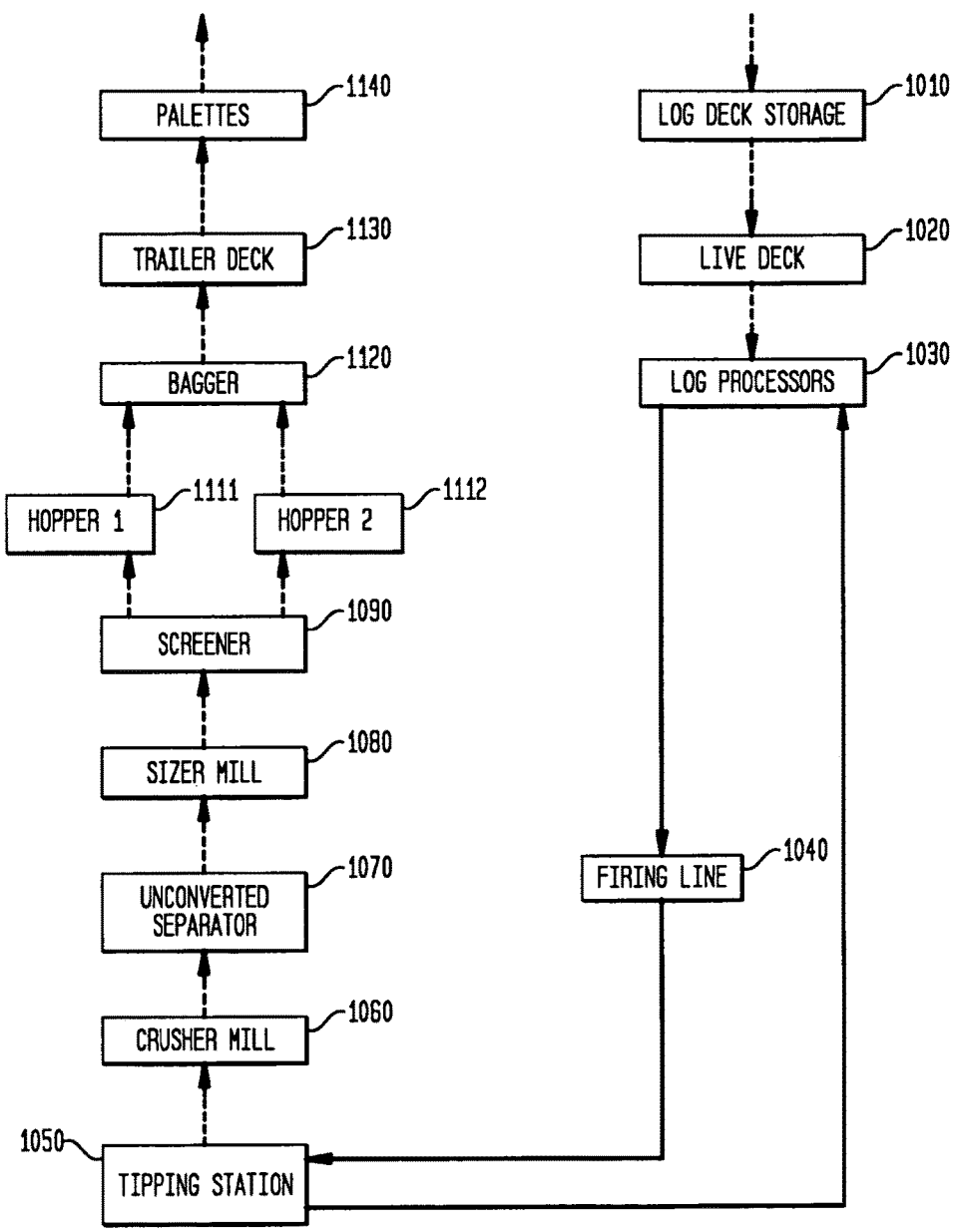
FIG. 14 illustrates a high-level schematic diagram of an example biochar manufacturing system.

FIG. 14 illustrates a high-level schematic diagram illustrating an example biochar manufacturing system. Generally, solid lines are used in the drawings to indicate movement of biochar kilns 100 while dashed lines are used in the drawings to indicate direct conveyance of feedstock or biochar.

An example of a biochar manufacturing system (or "production plant") includes one or more portable biochar kiln (such as the biochar kiln described above). While generally described as making use of example biochar kiln 100, manufacturing systems may be used with biochar kilns other than kiln 100. The production plant is configured in such a manner that the biochar kiln(s) 100 can be readily transported, using an automated handler 800. For example, the biochar kiln may be moved between a firing line 1040 (where pyrolysis occurs), a tipping station 1050 (where biochar is unloaded from the kiln), and a feedstock station (where the kiln is loaded with fresh feedstock) including log deck storage 1010, live deck 1020, and log processors 1030 (where feedstock is processed, e.g., to desired dimensions). It is noted that the live deck fits on a log processor and receives about ten logs, which are then conveyed by operator controls to the processor's main log chute for cutting and splitting.

Figure 11:
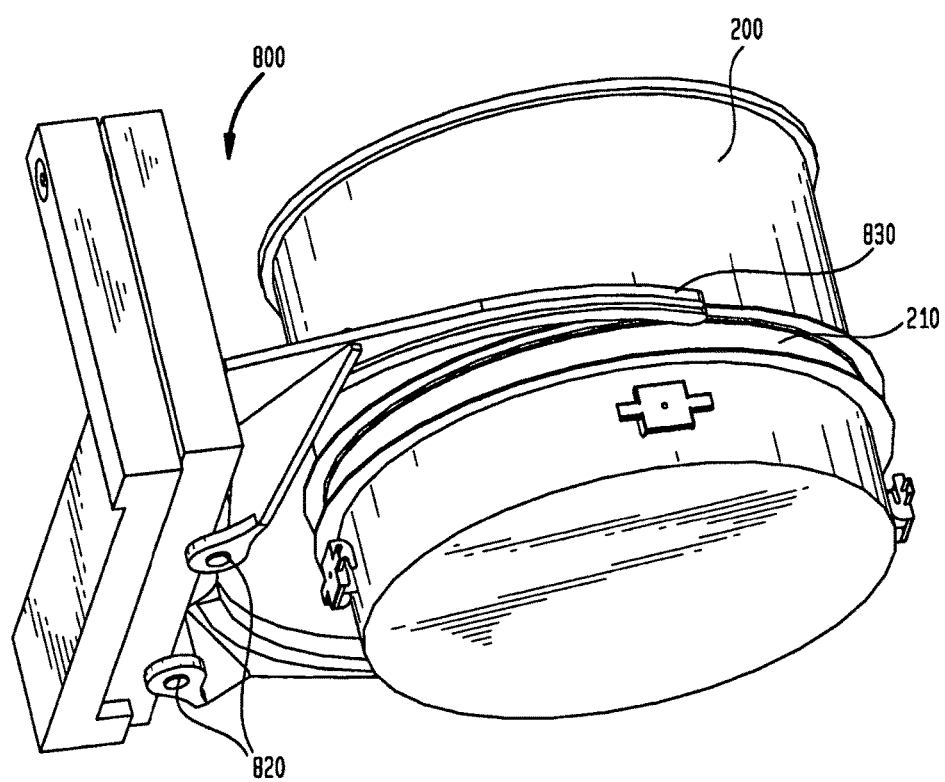
FIG. 11 illustrates an example automated handler acting to engage a biochar kiln.
Figure 12:
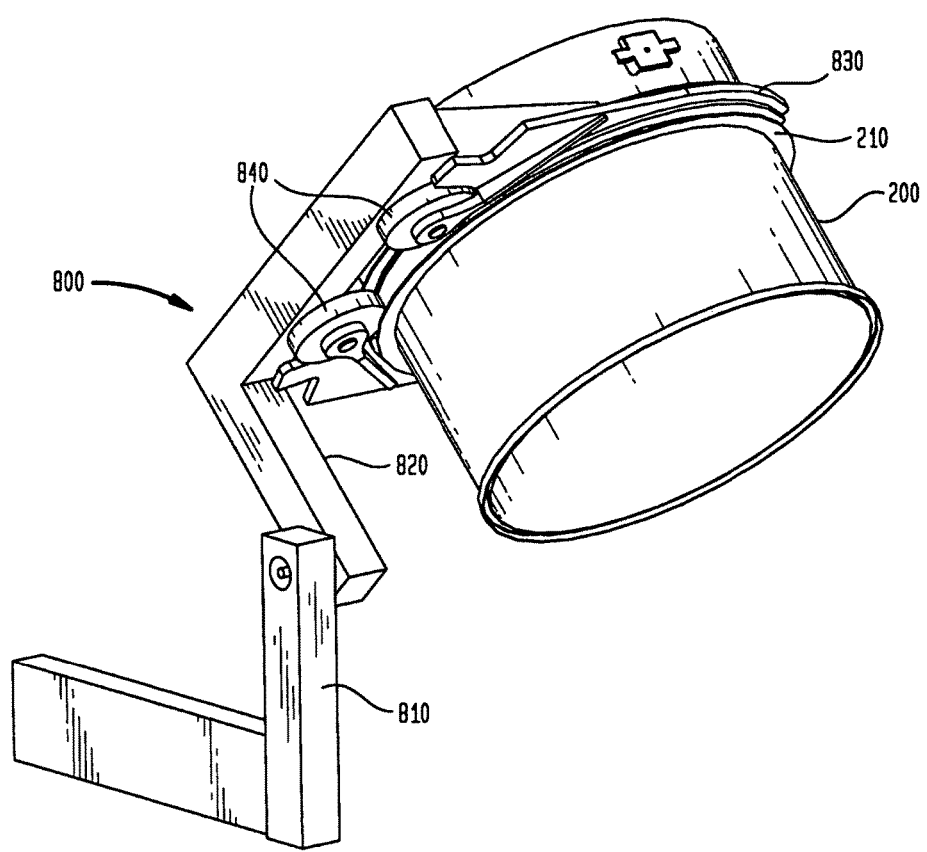
FIG. 12 illustrates the example automated handler of FIG. 10 engaged with and tipping a biochar kiln.

According to an example embodiment illustrated in FIGS. 11 and 12, an automated handler 800 may be used at the production plant. The handler 800 is illustrated as it may include base component 810, arm component 820, grippers 830 and rollers 840. In an example, the handler 800 may be configured to grasp and move a biochar kiln. Grippers 830 may be operated to selectively engage the exterior surface of walls 230 of kiln 100 at 210 to automated handler 800 to move a kiln 100 between a feedstock station, a firing line and a tipping station. Upon transport of a kiln to a tipping station, automated handler 800 may remove lid 110 through use of lid bail 600 or lid may be removed by a different mechanism.

Figure 13:
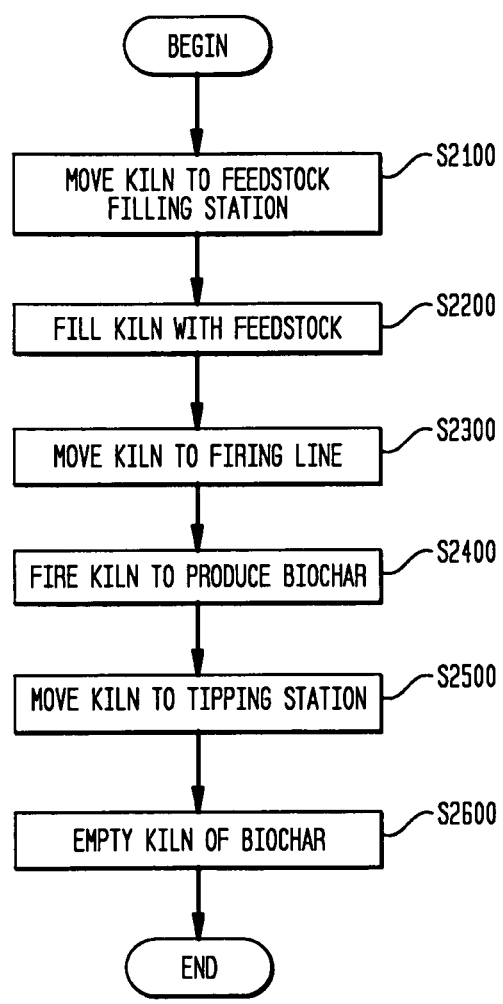
FIG. 13 illustrates a flow diagram showing an example process of moving a biochar kiln through an example biochar manufacturing system.

FIG. 13 illustrates a flow diagram showing an example process of moving a biochar kiln through an example biochar manufacturing system using an automated handler. In an example, the automated handler 800 lifts a kiln off the ground using grippers 830. In step S3100, the kiln is moved to a feedstock filling station where the kiln is filled with feedstock in step S3200 and lid 110 is replaced. The kiln is moved to firing line 1040 in step S3300. The kiln is then fired to convert feedstock into biochar at step S3400. Following the conversion process, primary/blower pipes are replaced with air seals, and the stack assembly is removed and hole is covered with stack seal. After fire suffocation and cooling, in step S3500, the kiln is moved to tipping station 1050 where lid 110 is removed and kiln 100 is emptied of biochar according to step S3600. After tipping, kiln lid 110 may be replaced for transportation back to the feedstock filling station.

Again referring to FIG. 14, feedstock may be delivered to the site by various transports, for example using trucks and/or trains. The feedstock may be provided to log deck storage 1010 and/or supplied directly to live deck 1020 for processing by log processors 1030. The logs may be machine cut and split to a predetermined size to achieve the desired feedstock product for provision to the interior of a biochar kiln such as, for example, that depicted in FIGS. 1-7 and indicated at 100.

Preprocessed feedstock may be automatically loaded into kiln 100. For example, a conveyor subsystem may be used to deliver preprocessed feedstock directly into kiln 100 from log processors 1030. A kiln loaded with feedstock may be transported to firing line 1040 where the feedstock will be converted to biochar product.

With reference again to FIG. 14, when the biochar conversion process is complete, the handler may move the biochar kiln 100 to a tipping station 1050 for subsequent delivery by a conveyor to crushing station 1050.

After processing (e.g., at crusher station 1050), the biochar may be separated into converted and unconverted portions by unconverted separator 1070. Unconverted portions of biochar may be re-fired (in a kiln) while converted portions may be moved on to sizer mill 1080 and screener 1090 for sorting into hopper(s) 1111 and 1112 according to size and/or other characteristics.

From hoppers 1111 and 1112, biochar product is conveyed to a bagger 1120 for placement into bags or directly to a trailer at trailer deck 1130. Bags of biochar product may be conveyed to palettes for product delivery. Shipping may be provided by means similar to those bringing feedstock to the site and may include but are not limited to trucks, trains, and/or watercraft.

Figure 15:
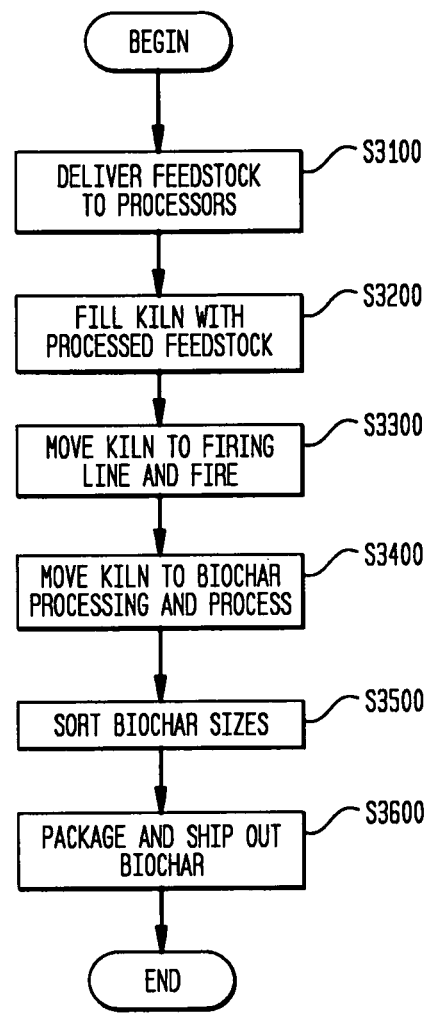
FIG. 15 illustrates a high level flow diagram showing an example biochar manufacturing process.

FIG. 15 illustrates a flow diagram of an example biochar manufacturing process in accordance with embodiments of the disclosure. In step 3100 feedstock is delivered to pre-processors. Feedstock is conveyed to a biochar kiln from pre-processors in a step S3200. Next, the kiln is moved to a firing line in step S3300. After firing, the kiln is moved to a tipping station in step S3400. In step S3500 biochar is sorted into sizes and in step S3600, sorted biochar is packaged and shipped from the manufacturing system.

Figure 16:
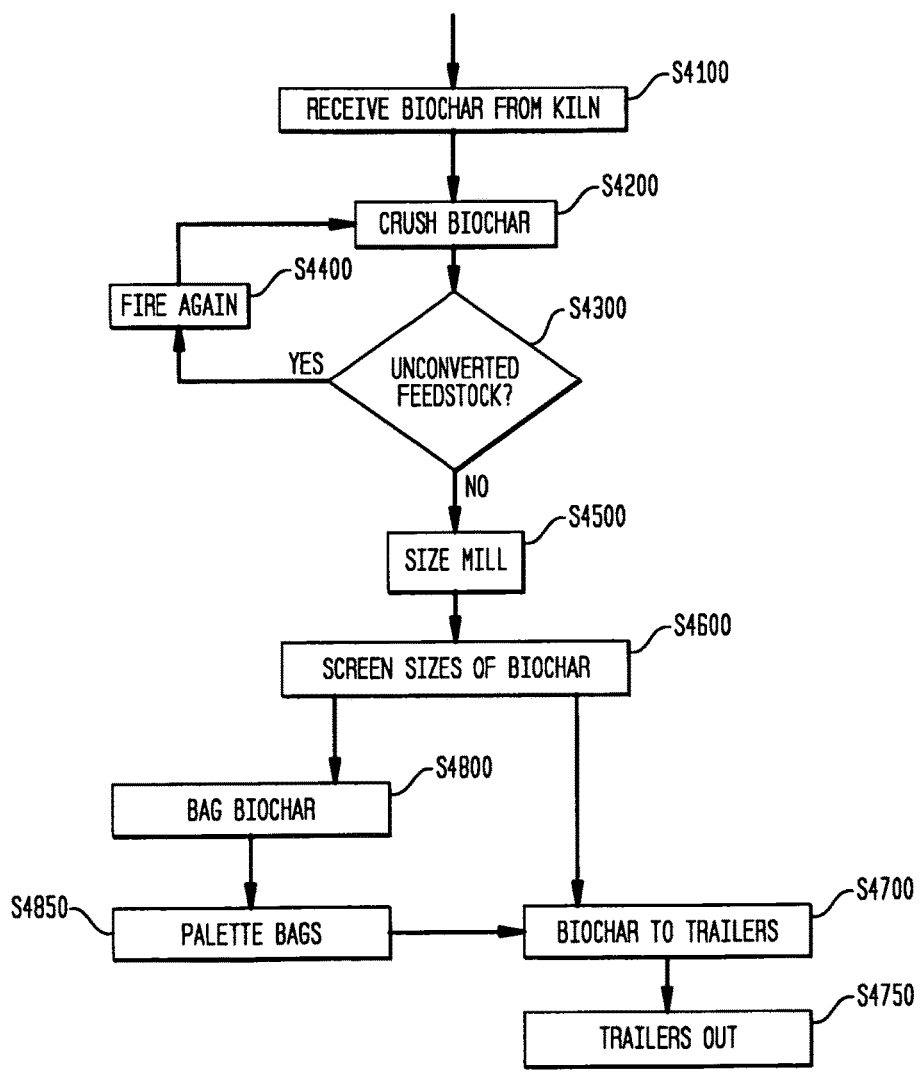
FIG. 16 illustrates a flow diagram showing additional details of the process depicted in FIG. 15.

FIG. 16 illustrates a flow diagram showing additional details of biochar processing. Biochar is received from kiln at tipping station 1050 in step S4100, biochar is crushed in step S4200 and conveyed to unconverted separator 1070. In step S4300, unconverted separator 1070 sorts biochar. If portions of biochar are unconverted, these portions may be fired again in step S4400. Converted portions of biochar may be processed (e.g., milled to size in step S4500, screened into different sizes in step S4600, and bagged in step S4800). The processed biochar may then be loaded (e.g., onto palettes or into shipping containers) according to step S4850 and readied for delivery (e.g., loaded onto trailers) according to step S4700. Haulers may leave the site to ship biochar in step S4750 to customers. In an example, sizes of biochar screened in step S4600 may be conveyed directly to haulers according to step S4700.

Operations may also include automatically covering the biochar kiln with a lid after the biochar kiln is loaded with feedstock. For example, automatically covering the biochar kiln may be by using the loader. The loader may also move the biochar kiln from the firing line to a crushing station for post-processing. For example, the loader may rotate the biochar kiln to dump the biochar product into a hopper for delivery to a crusher unit.

The examples shown and described are provided for purposes of illustration and are not intended to be limiting. Still other examples are also contemplated.

The invention claimed is:

1. A controllable biochar kiln with feedback control loop, comprising:
a drum, a lid and a floor together forming a combustion chamber configured to contain feedstock for conversion into biochar;
ribs positioned on the floor to define separate quadrants of the combustion chamber, the separate quadrants otherwise open to adjacent quadrants;
a plurality of air inlet pipes, wherein a separate air inlet pipe is associated with each of the quadrants of the combustion chamber;
a damper for each of the air inlet pipes, a valve position of each of the dampers controllable to adjust an amount of airflow in each of the separate quadrants;
an outlet configured to release smoke from the combustion chamber;
at least one air vent formed in a sidewall of the drum;
a blower having a variable speed motor controllable to adjust an airflow rate;
a plurality of sensors to measure conditions in the combustion chamber and generate sensor data based on the measured conditions; and
a controller configured to operate the dampers and blower in combination, based on the sensor data, to provide more air flow in one of the quadrants of the combustion chamber while at the same time providing less air flow in one of the other quadrants of the combustion chamber.

2. The controllable biochar kiln of claim 1, wherein the drum further comprises a grab ring channel formed between upper and lower flanges configured for engagement by an automated handler.

3. The controllable biochar kiln of claim 1, wherein the air inlet pipes is mounted above the floor into a wall of the drum.

4. The controllable biochar kiln of claim 1, further comprising at least one seal cover operatively coupled to at least one primary pipe through the drum.

5. The feedback system of claim 1, further comprising a notification generator configured to issue a notification based upon on detection of conditions reaching a process completion threshold.

6. The feedback system of claim 5, wherein the notification is electronic and is configured to automatically issue to local plant personnel.

7. The feedback system of claim 5, wherein the notification is electronic and is configured to automatically issue to a remote monitoring system.

8. The feedback system of claim 5, wherein the notification is configured to issue with advance warning to prevent unnecessary burning and reduction of quantity or quality of biochar yield.

9. The feedback system of claim 5, wherein the notification is configured to automatically end the biochar conversion process.

10. The feedback system of claim 5, wherein the notification is configured to automatically close and seal at least one vent or at least one chimney port.

* * * * *